(12) United States Patent
McNamer (10) Patent No.: US 8,965,121 B2
(45) Date of Patent: Feb. 24, 2015

(54) IMAGE COLOR MATCHING AND EQUALIZATION DEVICES AND RELATED METHODS

(71) Applicant: 3DMedia Corporation, Research Triangle Park, NC (US)

(72) Inventor: Michael McNamer, Apex, NC (US)

(73) Assignee: 3DMedia Corporation, Durham, NC (US)

( * ) Notice: Subject to any disclaimer, the term of this patent is extended or adjusted under 35 U.S.C. 154(b) by 0 days.

(21) Appl. No.: 14/044,902

(22) Filed: Oct. 3, 2013

(65) Prior Publication Data

US 2014/0099022 A1 Apr. 10, 2014

Related U.S. Application Data

(60) Provisional application No. 61/709,480, filed on Oct. 4, 2012.

(51) Int. Cl.
*G06K 9/00* (2006.01)
*G06T 11/00* (2006.01)

(52) U.S. Cl.
CPC ................................ *G06T 11/001* (2013.01)
USPC ............ 382/167; 382/162; 382/164; 382/165

(58) Field of Classification Search
USPC ................. 382/167, 164, 165, 162, 154, 276; 345/419, 420, 424; 348/211.11, 211.3, 348/211.8; 356/12
See application file for complete search history.

(56) References Cited

U.S. PATENT DOCUMENTS

| | | | | |
|---|---|---|---|---|
| 6,556,705 | B1 * | 4/2003 | Shalom | 382/154 |
| 7,444,013 | B2 * | 10/2008 | Chen | 382/154 |
| 7,936,374 | B2 * | 5/2011 | Cutler | 348/211.11 |
| 8,078,004 | B2 * | 12/2011 | Kang et al. | 382/276 |

* cited by examiner

*Primary Examiner* — Anh Do
(74) *Attorney, Agent, or Firm* — Olive Law Group, PLLC (57) ABSTRACT

Disclosed herein are image color matching and equalization devices and related methods. According to an aspect, a method may include determining overlapping portions of a scene within first and second images of the scene. The method may include generating an array of color channel differences between the overlapping portions. Further, the method may include applying a quantization technique to the array of color channel differences for creating a sparse difference color matrix. The method may also include identifying empty locations of the sparse matrix and computing interpolated difference color values to fill them. Further, the method may include modifying the color of at least one pixel of one of the images by performing an inverse look-up in the sparse table utilizing its color, identifying the color difference on the corresponding entry, and applying the color difference on the target pixel.

18 Claims, 7 Drawing Sheets

IMAGE COLOR MATCHING AND EQUALIZATION DEVICES AND RELATED METHODS

CROSS REFERENCE TO RELATED APPLICATION

This application claims the benefit of U.S. provisional patent application Ser. No. 61/709,480, filed Oct. 4, 2012, the disclosure of which is incorporated herein by reference in its entirety.

TECHNICAL FIELD

The subject matter disclosed herein relates to image processing. In particular, the subject matter disclosed herein relates to image color matching and equalization devices and related methods.

BACKGROUND

In any time or location-displaced capture of image data, parameters may change that can affect the overall and/or regional color balance of the image. Temporal displacement changes may occur for reasons such as changes in exposure parameters (e.g., shutter speed, aperture, or ISO gain) or because of lighting changes during the time displacement. Location displacement (e.g., camera location, wherein multiple cameras capture either synchronously or asynchronously) may be the result of camera sensor response differences due to sensor, lens, and/or other factors. Typical applications involving time displacement include stereo capture with a single camera, panoramic scene capture, and general image bursts. Location displacement scenarios include stereo or multi-view camera rigs with multiple cameras, and separate scene captures with difference cameras (possibly at different times as well). In all of these cases, for viewing enjoyment, there is a high interest in color matching the images. For stereoscopic viewing, this may be important to minimize color discrepancies between the left and right eyes that can cause discomfort. For panoramic stitching and viewing, it may be important to have a smooth appearance of the stitched images over the course of the panorama. For editing of multiple captured images (such as in video splices), it may be important to the smooth transition between footage. These applications and others demonstrate the importance of the problem.

A common technique in addressing this problem is the use of per channel (R/G/B or other color map color channels) histogram measurement and equalization, either globally or within "binned" regions of an image (e.g., shadow, midtone, and highlight). Such techniques experimentally prove to be variable with regard to how well they address the problem described, and in many cases are unsatisfactory due to the channel responses not being independent. Complex techniques may create better results, but at the expense of extreme computation times for even relatively small images.

In view of the foregoing, it is desired to provide improved systems and techniques for image color matching and equalization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with embodiments of the present disclosure, methods are provided for automatically matching and equalizing colors of multiple captured related images. Such capture scenarios may include stereoscopic (or multi-view) image or video capture, panoramic image capture, or multiple image or video captures of the same scene. Applications of such image equalization of such images include enhancement of stereoscopic viewing or panoramic stitching, improvement of video edit splicing, or reduction in workflow effort. The equalization methods may be related to the detection of overlapping similar color regions, and the localized correction of measured image differences.

In view of the preceding background, an object of the presently disclosed subject matter is to provide techniques of equalization between a reference image and an image to correct that addresses the issues of local color variance in the image and processing time. In particular, an example goal of algorithms described herein is to account for color response variation difference as may be expected from different digital camera systems, particularly of different optical "quality" (e.g., sensor size and type, lens size and type, resolution, and the like).

To accomplish this and other tasks, the present disclosure provides for identifying areas of overlap of the two images and binning the color channel differences for each channel into an array of possible color combinations. Quantization may be used to reduce the size of the array without degradation, and in many cases with improvement due to variance smoothing, of the result. The sparse array may then be filled with a curve fitting operation and indexed by the image targeted for correction to obtain a per pixel, and a per channel color difference offset for the image. The per pixel offset map may be filtered before being added to the image targeted for correction to create the final equalized image.

Disclosed herein are image color matching and equalization devices and related methods. According to an aspect, a method may include determining overlapping portions of a scene within first and second images of the scene. The method may also include generating an array of color channel differences between the overlapping portions. Further, the method may include applying a quantization technique to the array of color channel differences for reducing a size of the array. The method may also include applying a curve fitting operation to and indexing the array for generating a per pixel, color difference, offset map for an image targeted for correction. Further, the method may include filtering the offset map to generate an equalized image for the scene.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

While the embodiments have been described in connection with various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

It should be also noted that although techniques and processes in this disclosure will be described as applied to still images, the same processes and techniques can be also applied to video sequences. In this case, the results obtained by applying one of those techniques to one frame can be used for the subsequent frames as is, or can be used as starting points for improving the quality of the subsequent frames in the video sequence.

Figure 1:
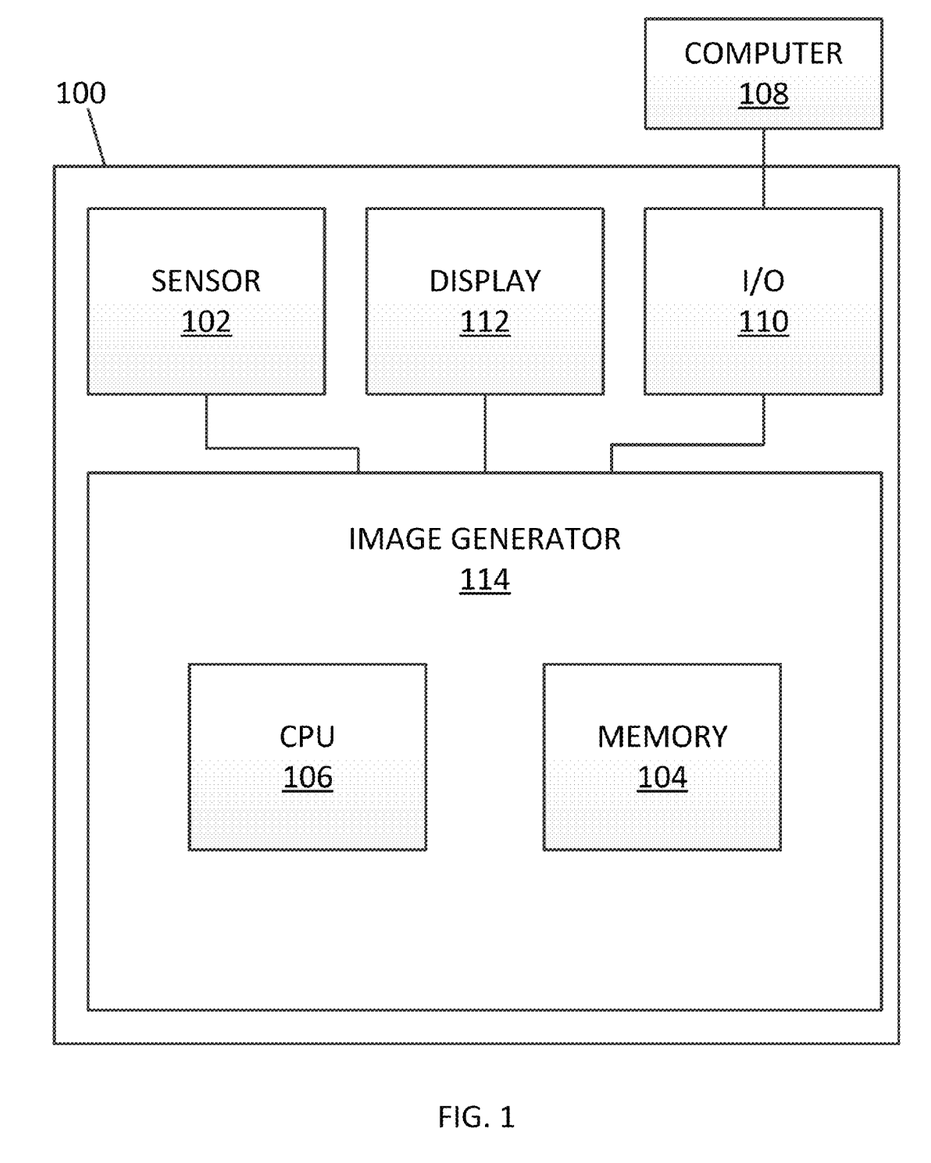
FIG. 1 is a block diagram of an exemplary device for image color matching and equalization according to embodiments of the present disclosure.

FIG. 1 illustrates a block diagram of an exemplary device 100 for image color matching and equalization according to embodiments of the present disclosure. In this example, device 100 is a digital camera capable of capturing several consecutive, still digital images of a scene. In another example, the device 100 may be a video camera capable of capturing a video sequence including multiple still images of a scene. In yet another example, the device 100 may be a smartphone capable of capturing a video sequence or multiple images of a scene. A user of the device 100 may position the camera in the same position or different positions for capturing multiple images of a scene. The captured images may be suitably stored, analyzed and processed for generating one or more panoramic and/or three-dimensional images of a scene. As an example, subsequent to capturing the images of the scene, the device 100, alone or in combination with a computer, may use the images for generating a panoramic or three-dimensional image of the scene and for displaying the panoramic or three-dimensional image to the user.

Referring to FIG. 1, the device 100 includes a sensor array 102 of charge coupled device (CCD) sensors or CMOS sensors which may be exposed to a scene through a lens and exposure control mechanism as understood by those of skill in the art. The device 100 may also include analog and digital circuitry such as, but not limited to, a memory 104 for storing program instruction sequences that control the device 100, together with a CPU 106, in accordance with embodiments of the present disclosure. The CPU 106 executes the program instruction sequences so as to cause the device 100 to expose the sensor array 102 to a scene and derive a digital image corresponding to the scene. The digital image may be stored in the memory 104. All or a portion of the memory 104 may be removable, so as to facilitate transfer of the digital image to other devices such as a computer 108. Further, the device 100 may be provided with an input/output (I/O) interface 110 so as to facilitate transfer of digital image even if the memory 104 is not removable. The device 100 may also include a display 112 controllable by the CPU 106 and operable to display the images for viewing by a camera user.

The memory 104 and the CPU 106 may be operable together to implement an image generator function 114 for image color matching and equalization in accordance with embodiments of the present disclosure. The image generator function 114 may also generate a panoramic image set or a three-dimensional image set of a scene using two or more images of the scene captured by the device 100.

In an example operation, the device 100 may be operated by a user to capture multiple images of a scene. The images may be captured for generating a panoramic image set or a three-dimensional image set of the scene. The image generator 114 may receive the captured images of the scene. In response to receipt of the captured images, the image generator 114 may determine overlapping portions of a scene within two or more of the images. Subsequently, the image generator 114 may generate an array of color channel differences between the overlapping portions. Further, the image generator 114 may apply a quantization technique to the array of color channel differences for reducing a size of the array. The image generator 114 may also apply a curve fitting operation to and index the array for generating a per pixel, color difference, offset map for an image targeted for correction. The image generator 114 may filter the offset map to generate an equalized image for the scene.

Figure 2:
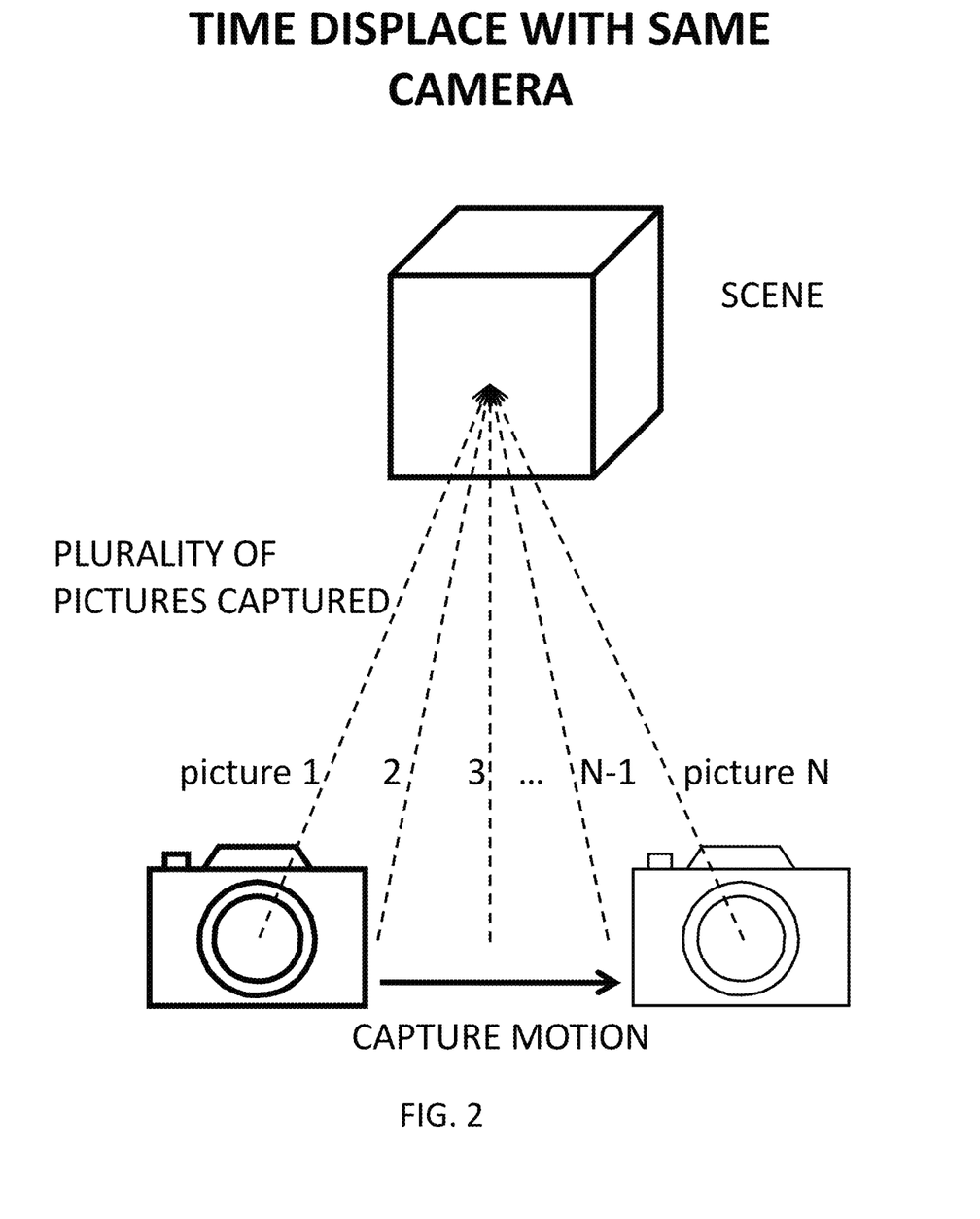
FIG. 2 is a diagram of an example instance of the problem as might arise from a time displaced stereo capture of a scene using a single camera.

As previously noted, some of the problems addressed herein involve the capture of one or more frames of image data and the equalization of the colors in those frames with one of a previously captured frame of image data or one of the current capture set. FIG. 2 illustrates a diagram of an example instance of the problem as might arise from a time displaced stereo capture of a scene using a single camera. In such a case, changes in color will primarily be related to changes in exposure values and/or lighting conditions during the displacement, since otherwise the camera remains the same.

Figure 3:
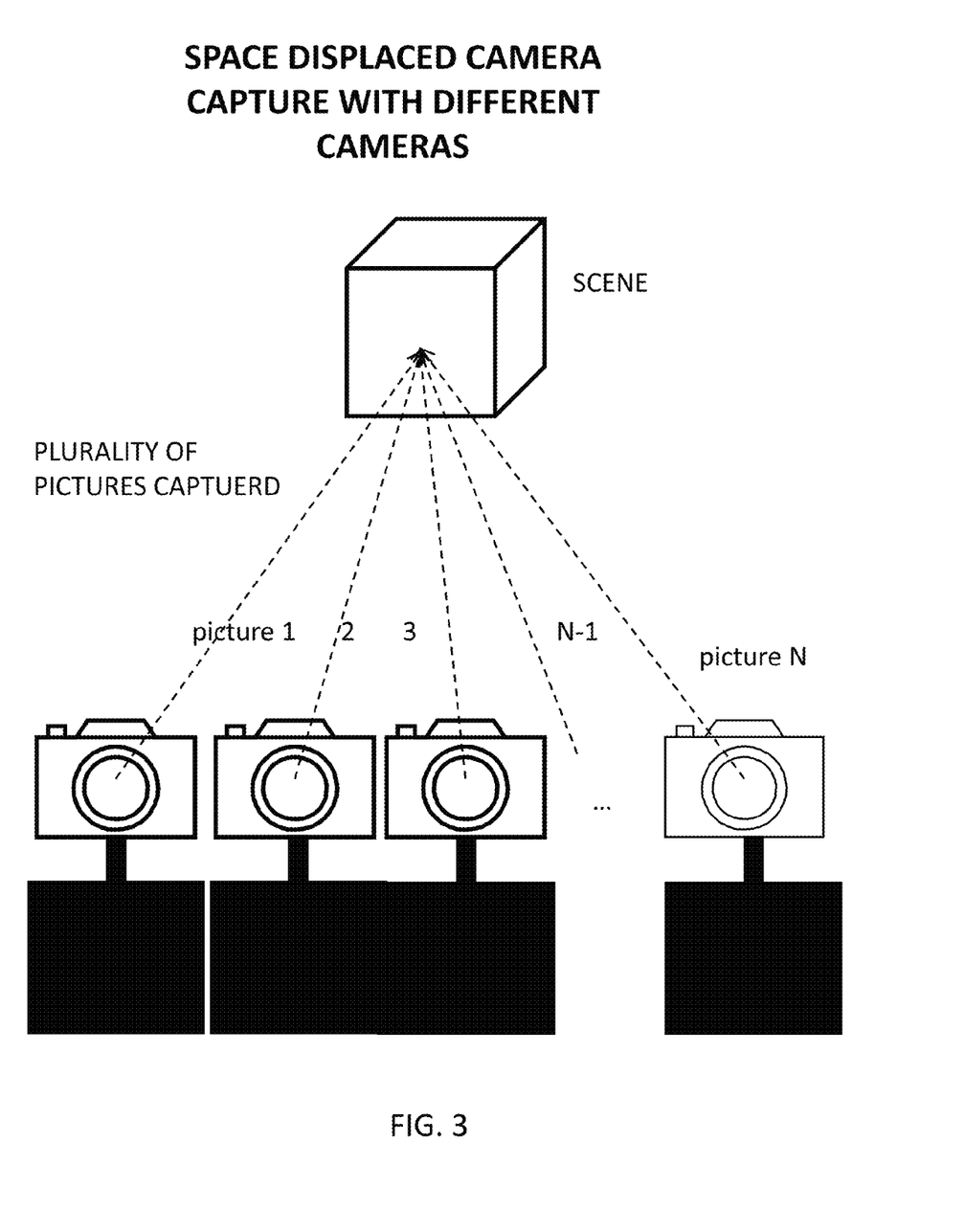
FIG. 3 is a diagram of another example instance of the problem, such as might arise from a capture (either time displaced or not) using multiple cameras, each of which may have different color responses to different light.

FIG. 3 illustrates a diagram of another example instance of the problem, such as might arise from a capture (either time displaced or not) using multiple cameras, each of which may have different color responses to different light. This instance of the problem presents a much greater challenge to an algorithm because the perception of each individual RGB (or other color map) channel may be dependent on the other channel values (e.g., red dependent on green and blue levels). It should be noted at this point that herein reference can be made to the RGB color space, but that the algorithm equally applies to any N-channel color space (e.g., YCbCr, LAB, and the like). Under the same capture mechanism there may be various types of stereoscopic cameras that utilize two fixed sensor/lens subsystems, or beamsplitter assemblies that split and direct light to different part of sensor(s).

Figure 4:
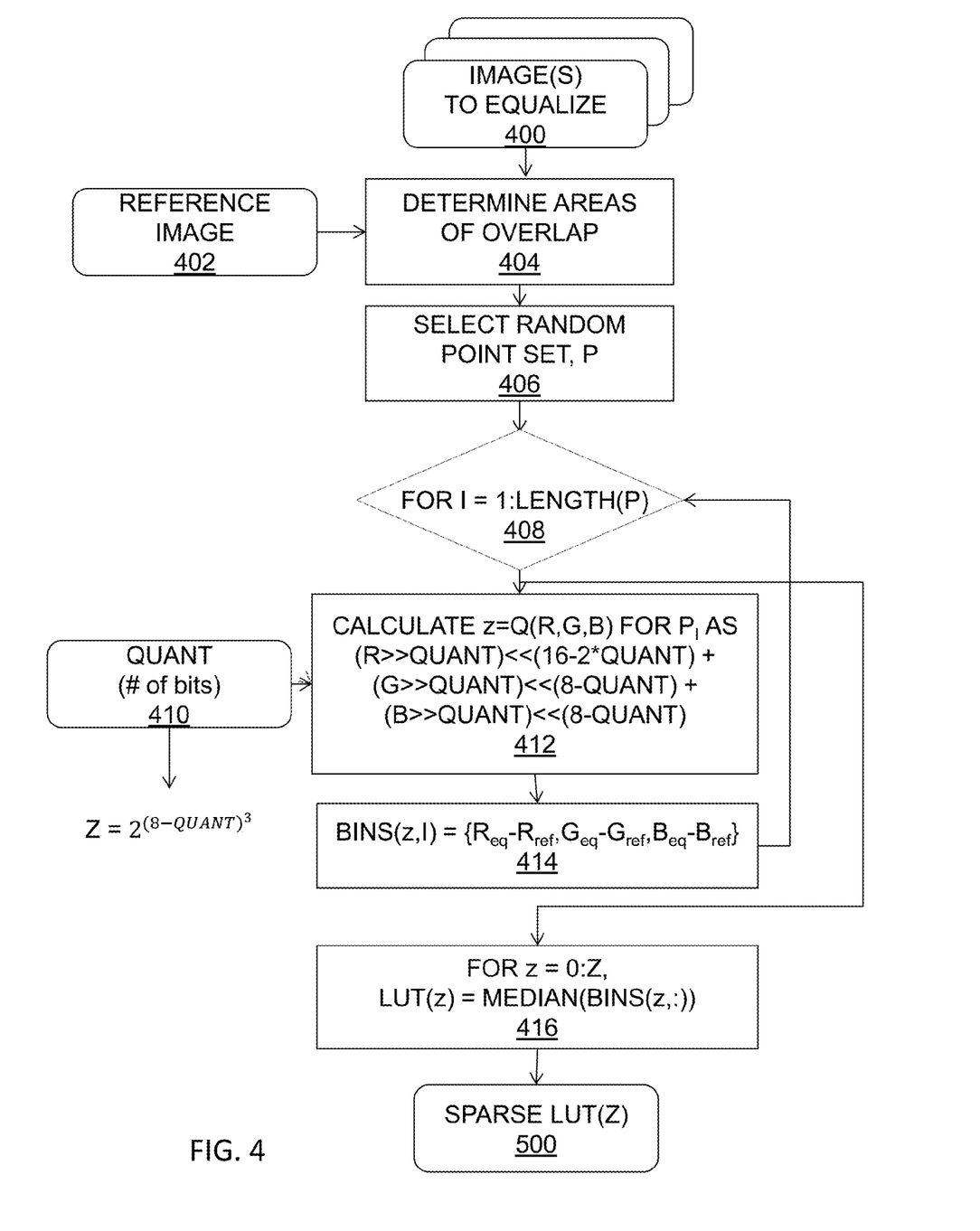
FIG. 4 is a flow chart of an example color sampling stage in accordance with embodiments of the present disclosure.

The algorithm, as presented, may be divided into three basic stages: the color sampling stage, the correction filtering stage, and the correction application stage. FIG. 4 illustrates a flow chart of an example color sampling stage in accordance with embodiments of the present disclosure. At the initiation of the method at step 400, a set of images to be equalized is presented to the algorithm. The images may include a set of frame captures of a same general scene, meaning at least some portion of the images is known to overlap. The method may include selecting one of this set as a reference image (step 402). Alternatively, the method may include identifying a similar capture of the scene, as the basis of equalization. Without loss of generality, henceforth it may be assumed that there is a single image to equalize to a reference.

The method may also include determining overlapping portions of the scene (step 404). The methodology used to perform this step can be one of many. For stereoscopic capture applications, much of the image may overlap, and hence, an embodiment of this method may involve taking the color differences of the two images at each pixel and applying an adaptive low-pass filter (such as less than the mean plus one standard deviation) on the difference levels to identify those pixels with the same approximate color. This approach can be further refined by detecting the overlapping regions of the images and applying the algorithm only on those regions. In more complex scenarios of the same general approach, image corner points (or other feature points) can be extracted from each image and correlated between the two images to define approximate areas of shift between the two images before proceeding with a similar difference operation. The images can be also registered or rectified prior to any calculation of the difference level. Such embodiments of the process may be applied both to the stereoscopic case as well as to panoramic captures or other scenarios. In another embodiment for panoramic capture and processing, the panoramic software itself may identify the areas of overlap, as is necessary for the stitching process. Another embodiment may include manual selection of overlap. Other embodiments of this process may also be implemented as will be understood by those of skill in the art.

From the identified set of overlapping points determined in step 404, a random subset of points, P, may be chosen in step 406. This step may be performed to increase the speed of the algorithm by shrinking the number of points to process. In the case of small areas of overlap, the set P can be the same as the total set of overlap.

Subsequently, the method may enter a looping stage 408-414 on the set of points P. A purpose of this stage is to build the initial table of correction values. Each pixel may consist of R, G, and B values, identified here as $R_{ref}$, $G_{ref}$, $B_{ref}$ for the reference image and $R_{eq}$, $G_{eq}$, $B_{eq}$ for the image to correct. The generalized method may include recording the R, G, and B differences for each pixel in an array, wherein the array is indexed by $(R_{eq}<<2*M)+(G_{eq}<<M)+B_{eq}$, where the operations "<<" and ">>" are arithmetic shifts left and right, respectively. M represents the number of bits per channel in the color space, and so may be 8 for current image applications.

It is immediately noteworthy that such an array may be massive and consume far too much memory to make the process viable. Moreover, such an array, utilizing all values of R, G, and B in an image versus the total available space may likely be very sparsely filled. Recognizing this, the method may utilize quantization of the values at step 410, where the quantizer is a power of 2 and is represented in FIG. 4 as a number of bits to shift. Typical quantization values may be 16 or 32, although the choice is largely application dependent.

So then, rather than recording RGB differences between the two images as $(R_{eq}<<2*M)+(G_{eq}<<M)+B_{eq}$, each pixel P index in an array may be $z=[(R_{eq}>>QUANT)<<(2*M-2*QUANT)]+[(G_{eq}>>QUANT)<<(M-QUANT)]+(B_{eq}>>QUANT)$. Within each indexed array point are the values $R_{ref}-R_{eq}$, $G_{ref}-G_{eq}$, and $B_{ref}-B_{eq}$ for the given pixel I in the set P. For array locations indexed multiple times, all difference values are recorded. This method may proceed for all I in P.

After building the sample array, BINS, the method may proceed to building the look-up table for correction (LUT) (step 414). It may be known that the maximum value, Z, of the LUT may be $2^{(M-QUANT)^3}$, or for a quantization of 32 (QUANT=5) and M=8, $Z=2^{(3)^3}=8^{(3)}=512$. So, traversing the array BINS, for each z from 1 to Z, if BINS is not empty for the value z (meaning at least once it has been indexed by the image), LUT(z) is set to the median values of each of the R, G, and B difference values (independently) recorded for BINS (z). As an example to illustrate, suppose that the BINS array was indexed at value 120 3 times by the data sampled in the image, and that the values recorded are [(9, 40, 16); (14, 31, 1); (11, 77, 14)]. The values recorded for LUT(120) may be the triplet (11, 40, 14), representing the median of the differences for pixels that indexed the BINS array at 120. Alternatively averaging, as well as other combining/averaging methods of the pixels of each color, can be performed to calculate the target LUT value. The completion of this method generates a sparsely filled LUT of color difference values between the images (step 500).

Figure 5:
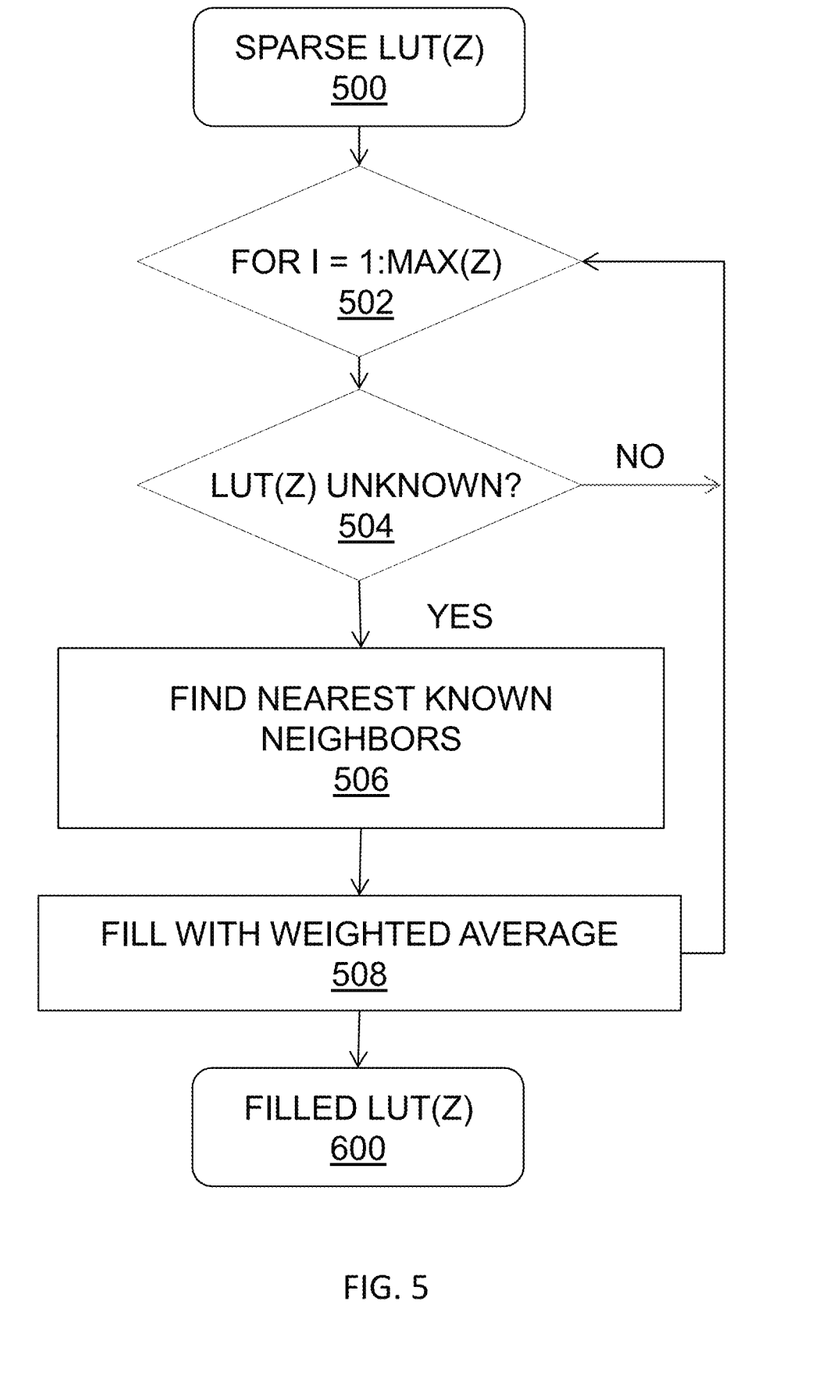
FIG. 5 is a flow chart of an example method for correction of factor filtering in accordance with embodiments of the present disclosure.

Color sampling is followed by correction filtering, in which the sparse LUT matrix 500 is converted to be dense, as in FIG. 5, which illustrates a flow chart of an example method for correction of factor filtering in accordance with embodiments of the present disclosure. As with the table building process in color sampling, the correction filtering process iterates (step 502) over the range of possible values 1 to Z for indices into the LUT array. If a particular index of LUT is undefined (empty) at step 504, the weighted average of the nearest neighbors that are non-empty 506 is calculated for use as that indexed LUT value (step 508). The method represents an extremely simple curve fit for the LUT indices using the known values, and is exemplary. Other, curve fitting procedures to fill in the sparse LUT array could be employed with equivalent success. The method may complete with a fully filled LUT (step 600).

Figure 6:
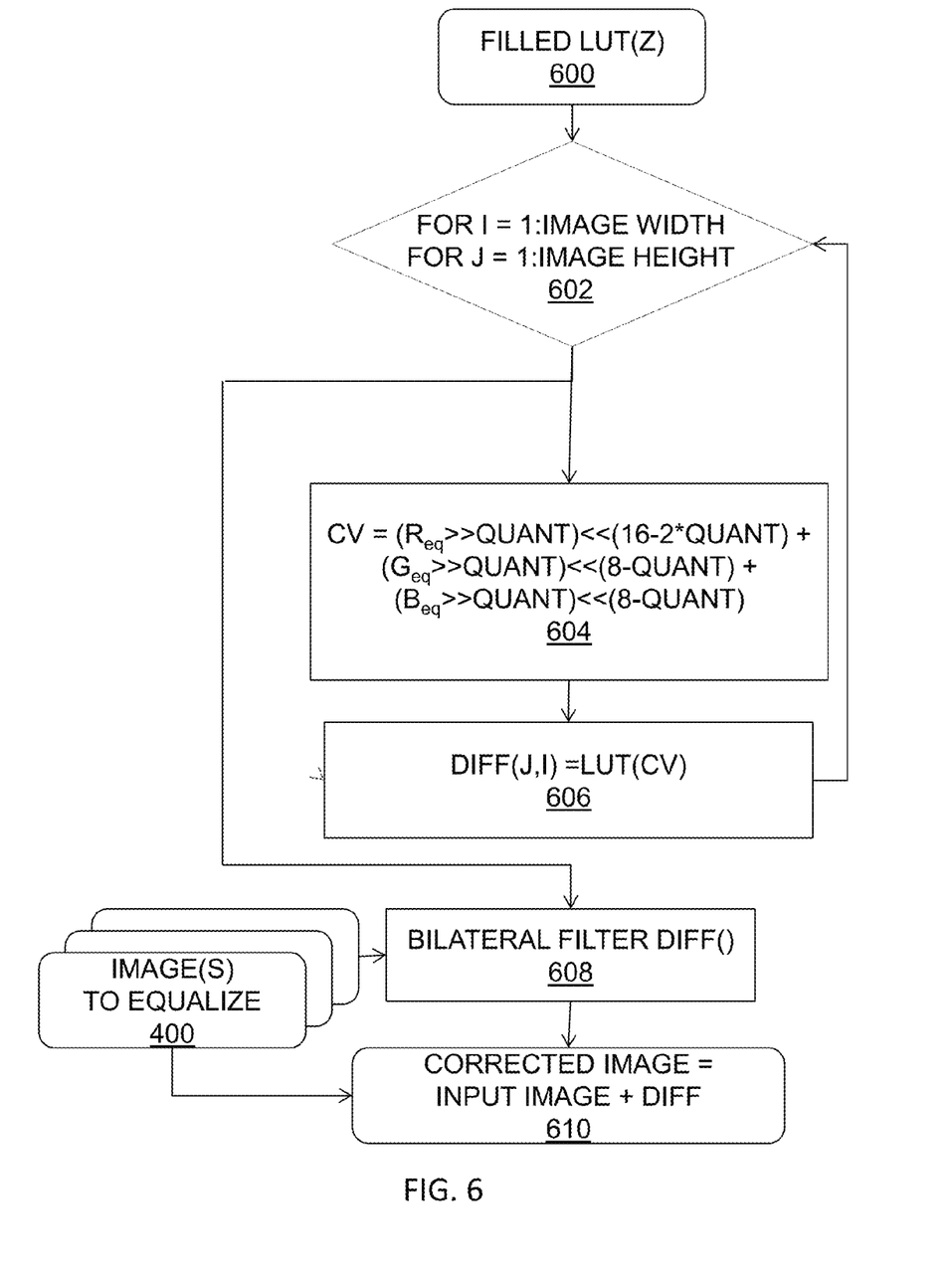
FIG. 6 is a flow chart of an example method for correction according to embodiments of the present disclosure.

FIG. 6 illustrates a flow chart of an example method for correction according to embodiments of the present disclosure. Referring to FIG. 6 at step 600, a full correction matrix has been attained. For each pixel index, i, j (step 602) of the image to be equalized, the method includes calculating as before at step 604:
$CV=[(R_{eq}(i,j)>>QUANT)<<(2*M-2*QUANT)]+[(G_{eq}(i,j)>>QUANT)<<(M-QUANT)]+(B_{eq}(i,j)>>QUANT)$, and use the value CV to index the LUT array (step 606) to obtain a value DIFF(i,j)=LUT(CV), which represents the difference to be applied to the that pixel in the image to be equalized to create the same color as in the reference image. The method may complete after all pixels have been iterated.

The matrix of DIFF values can be next filtered using a technique that accounts for locality of pixel groupings, similarity of colors, and edge boundaries. The embodiment herein is to use a bilateral filter (step 608), based on the luminance values of the image to equalize as "edge" data, however, other filters that address the localization requirement may be employed. An example may be to perform a segmentation operation on the image and utilize the segmented labels as guidance for filtering. The filtering step may act as a localized smoothing of the difference data to remove outliers and errors from poor initial samples. Finally, the equalized image is formed by summing the per channel values of the filtered DIFF matrix with the image to be equalized and the process completes for the current image (step 610). For video sequences or panoramic sequences, because the area of overlap may decrease over time relative to the initial reference image, one approach is to update the reference image to be the current corrected image before proceeding to the equalize the next (e.g., B is equalized to A, C is equalized to corrected B, and the like) (step 400).

Embodiments of the present disclosure may be implemented by a digital still camera, a video camera, a mobile phone, a smart phone, and the like. In order to provide additional context for various aspects of the present disclosure, FIG. 7 and the following discussion are intended to provide a brief, general description of a suitable operating environment 700 in which various aspects of the present disclosure may be implemented. While the present disclosure is described in the general context of computer-executable instructions, such as program modules, executed by one or more computers or other devices, those skilled in the art will recognize that it can also be implemented in combination with other program modules and/or as a combination of hardware and software.

Figure 7:
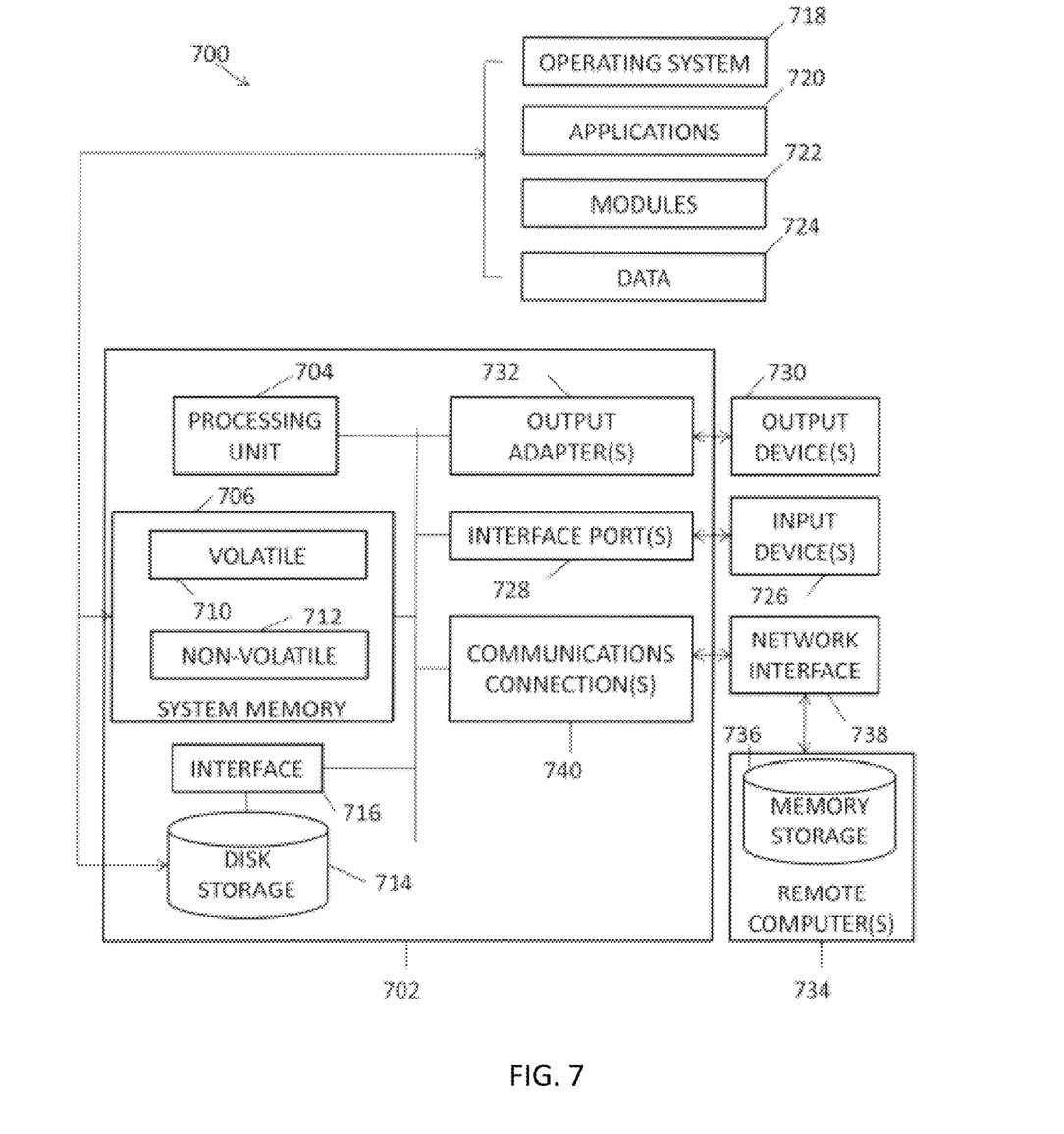
FIG. 7 is an example environment for implementing various aspects of the present disclosure.

Generally, however, program modules include routines, programs, objects, components, data structures, etc. that perform particular tasks or implement particular data types. The operating environment 700 is only one example of a suitable operating environment and is not intended to suggest any limitation as to the scope of use or functionality of the present disclosure. Other well-known computer systems, environments, and/or configurations that may be suitable for use with the present disclosure include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 700 for implementing various aspects of the present disclosure includes a computer 702. The computer 702 includes a processing unit 704, a system memory 706, and a system bus 708. The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 706 includes volatile memory 710 and nonvolatile memory 712. The basic input/output system (BIOS), containing the basic routines to transfer information between elements within the computer 702, such as during start-up, is stored in nonvolatile memory 712. By way of illustration, and not limitation, nonvolatile memory 712 can include read only memory (ROM), programmable ROM (PROM), electrically programmable ROM (EPROM), electrically erasable ROM (EEPROM), or flash memory. Volatile memory 710 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 702 also includes removable/nonremovable, volatile/nonvolatile computer storage media. FIG. 7 illustrates, for example a disk storage 714. Disk storage 714 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used such as interface 716.

It is to be appreciated that FIG. 7 describes software that acts as an intermediary between users and the basic computer resources described in suitable operating environment 700. Such software includes an operating system 718. Operating system 718, which can be stored on disk storage 714, acts to control and allocate resources of the computer system 702. System applications 720 take advantage of the management of resources by operating system 718 through program modules 722 and program data 724 stored either in system memory 706 or on disk storage 714. It is to be appreciated that the present disclosure can be implemented with various operating systems or combinations of operating systems.

A user enters commands or information into the computer 702 through input device(s) 726. Input devices 726 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 704 through the system bus 708 via interface port(s) 728. Interface port(s) 728 include, for example, a serial port, a parallel port, a game port, and a universal serial bus (USB). Output device(s) 730 use some of the same type of ports as input device(s) 726. Thus, for example, a USB port may be used to provide input to computer 702 and to output information from computer 702 to an output device 730. Output adapter 732 is provided to illustrate that there are some output devices 730 like monitors, speakers, and printers among other output devices 730 that require special adapters. The output adapters 732 include, by way of illustration and not limitation, video and sound cards that provide a means of connection between the output device 730 and the system bus 708. It should be noted that other devices and/or systems of devices provide both input and output capabilities such as remote computer(s) 734.

Computer 702 can operate in a networked environment using logical connections to one or more remote computers, such as remote computer(s) 734. The remote computer(s) 734 can be a personal computer, a server, a router, a network PC, a workstation, a microprocessor based appliance, a peer device or other common network node and the like, and typically includes many or all of the elements described relative to computer 702. For purposes of brevity, only a memory storage device 736 is illustrated with remote computer(s) 734. Remote computer(s) 734 is logically connected to computer 702 through a network interface 738 and then physically connected via communication connection 740. Network interface 738 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 740 refers to the hardware/software employed to connect the network interface 738 to the bus 708. While communication connection 740 is shown for illustrative clarity inside computer 702, it can also be external to computer 702. The hardware/software necessary for connection to the network interface 738 includes, for exemplary purposes only, internal and external technologies such as, modems including regular telephone grade modems, cable modems and DSL modems, ISDN adapters, and Ethernet cards.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the present disclosure. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the present disclosure. When implemented on a general-purpose processor, the program code combines with the processor to provide a unique apparatus that operates to perform the processing of the present disclosure.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   using at least one processor for:
   determining overlapping portions of a scene within first and second images of the scene;
   generating an array of color channel differences between the overlapping portions;
   applying a quantization technique to an array of color channel differences for creating a sparse difference color matrix;
   identifying empty locations of the sparse matrix and computing interpolated difference color values to fill them; and
   modifying the color of at least one pixel of one of the images by performing an inverse look-up in the sparse table utilizing its color, identifying the color difference on the corresponding entry, and applying the color difference on a target pixel.

2. The method of claim 1, wherein determining overlapping portions of the scene comprises applying an adaptive low-pass filter.

3. The method of claim 1, wherein determining overlapping portions of the scene comprises determining one of image corners, and image feature points in each of the first and second images.

4. The method of claim 1, further comprising one of rectifying, and registering the first and second images.

5. The method of claim 1, further comprising selecting a set of points.

6. The method of claim 5, further comprising selecting a random set of points.

7. The method of claim 5, further comprising creating a sparse matrix utilizing a selected set of points and their corresponding color values in both the first and second images.

8. The method of claim 7, further comprising filtering entries on the sparse matrix that contain more than one color sets and replacing the entry with the filtered value.

9. The method of claim 7, further comprising filling the empty entries of the sparse matrix by calculating interpolated values of color values found in other parts of the sparse matrix.

10. The method of claim 9, further comprising performing a curve fitting operation to filter the values of the sparse matrix.

11. The method of claim 10, further comprising filtering the values of the sparse table by use of a technique that accounts for one of a locality of pixel groupings, and a similarity of colors, and edge boundaries.

12. The method of claim 11, further comprising:
    performing a segmentation operation on the image; and
    using the segmented labels as guidance for filtering the localization requirement.

13. The method of claim 1, further comprising performing a look-up table operation, for each pixel to be corrected, to identify its corresponding entry value on a table.

14. The method of claim 13, further comprising modifying each pixel to be corrected by use of its corresponding entry value.

15. The method of claim 7, wherein generating the array of color channel differences comprises:
    determining R, G, and B values of the overlapping portions of the reference image;
    determining R, G, and B values of the overlapping portions of the image to be corrected; and
    using the R, G, and B values to generate the array of color channel differences.

16. The method of claim 1, further comprising generating a look-up table for correction, wherein the look-up table comprises color difference values between the first and second images.

17. The method of claim 1, further comprising generating one of a panoramic image set and a three-dimensional image set using an equalized image.

18. The method of claim 1, further comprising capturing the first and second images of the scene.

\* \* \* \* \*